Sept. 11, 1928.

W. H. D'ARDENNE ET AL 1,683,762

WORK HOLDER FOR WELDING

Filed Sept. 12, 1925

12 Sheets-Sheet 1

Fig. 1.

INVENTORS
Walter H. D'Ardenne
J. Olin Landis
Lewis H. Christensen
BY
their ATTORNEY

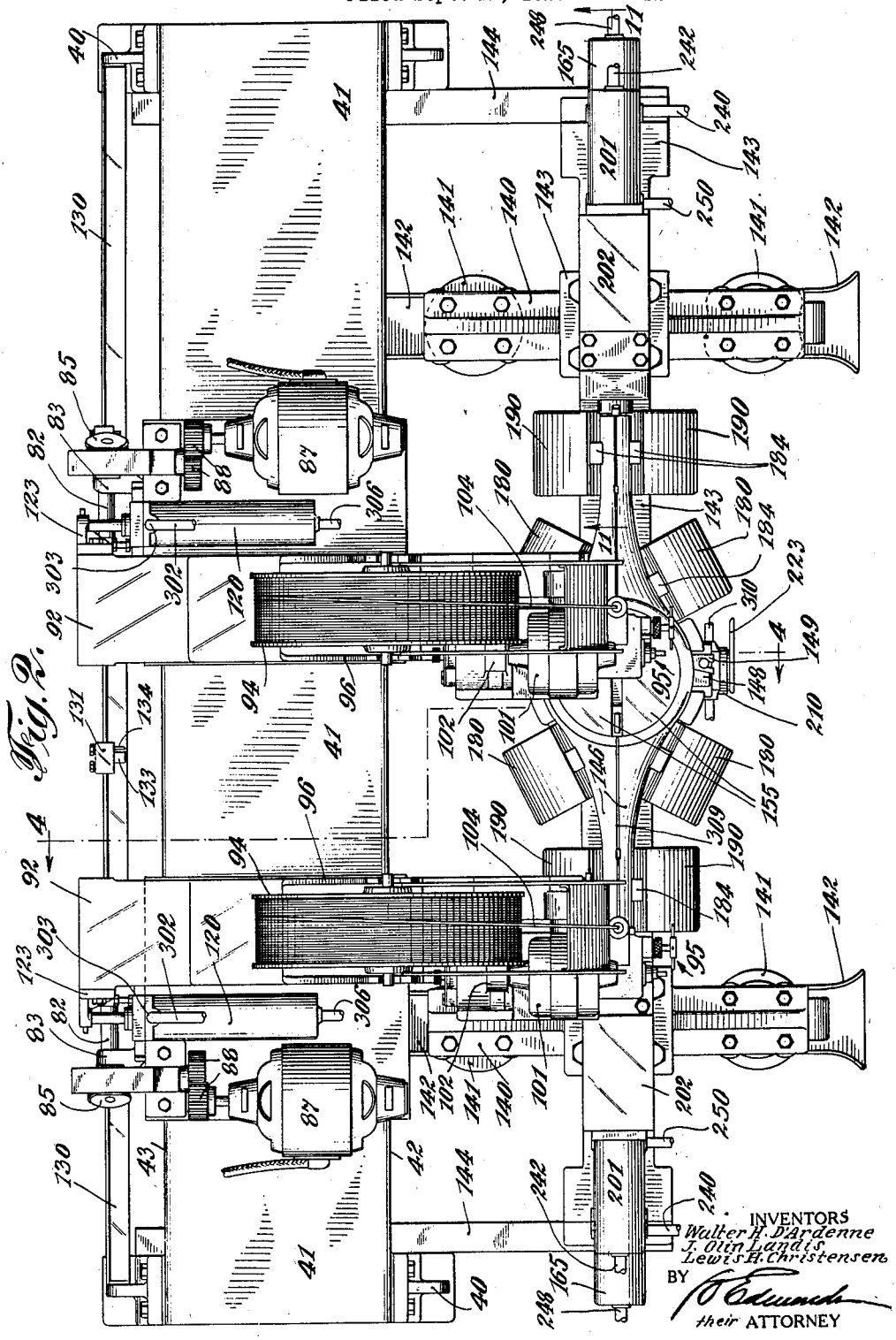

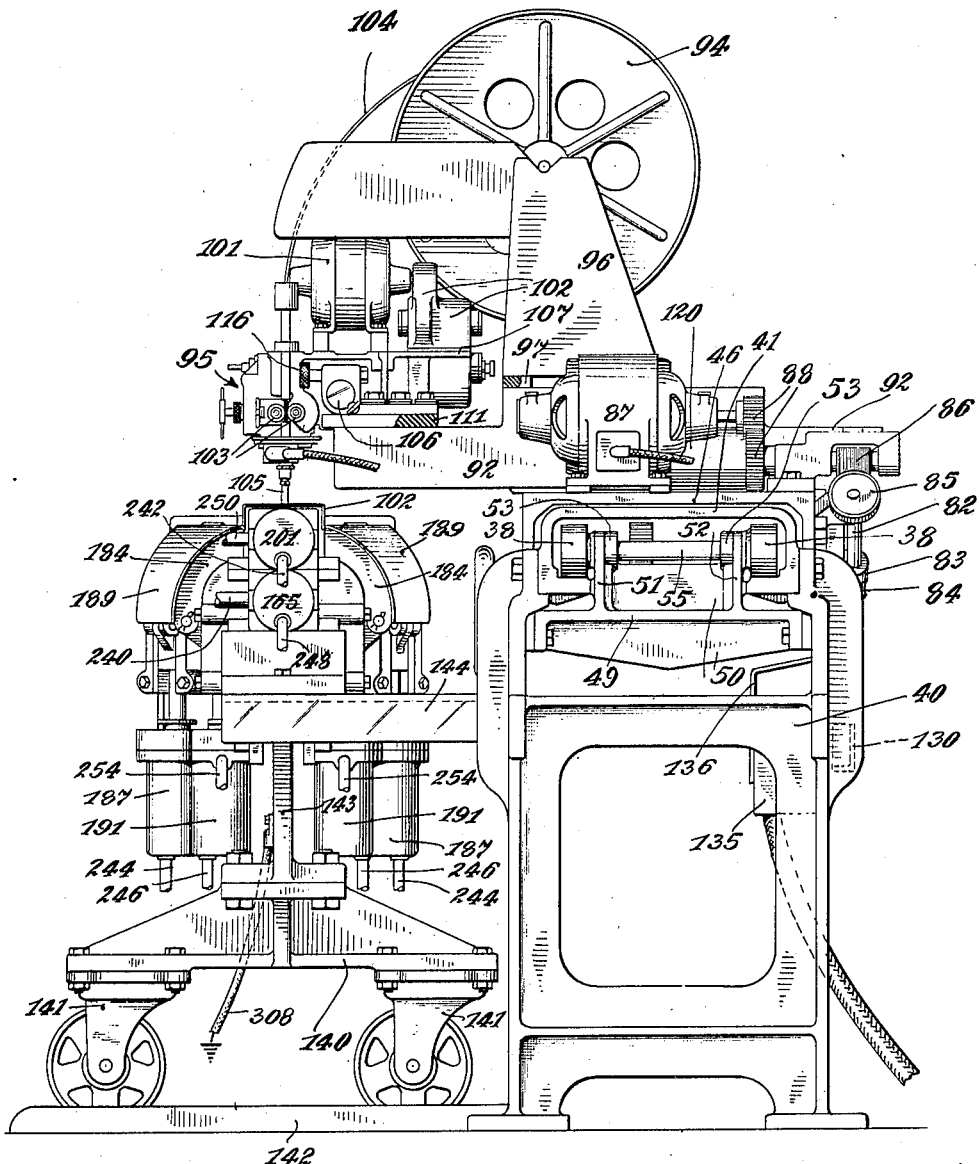

Sept. 11, 1928. 1,683,762
W. H. D'ARDENNE ET AL
WORK HOLDER FOR WELDING
Filed Sept. 12, 1925 12 Sheets-Sheet 4
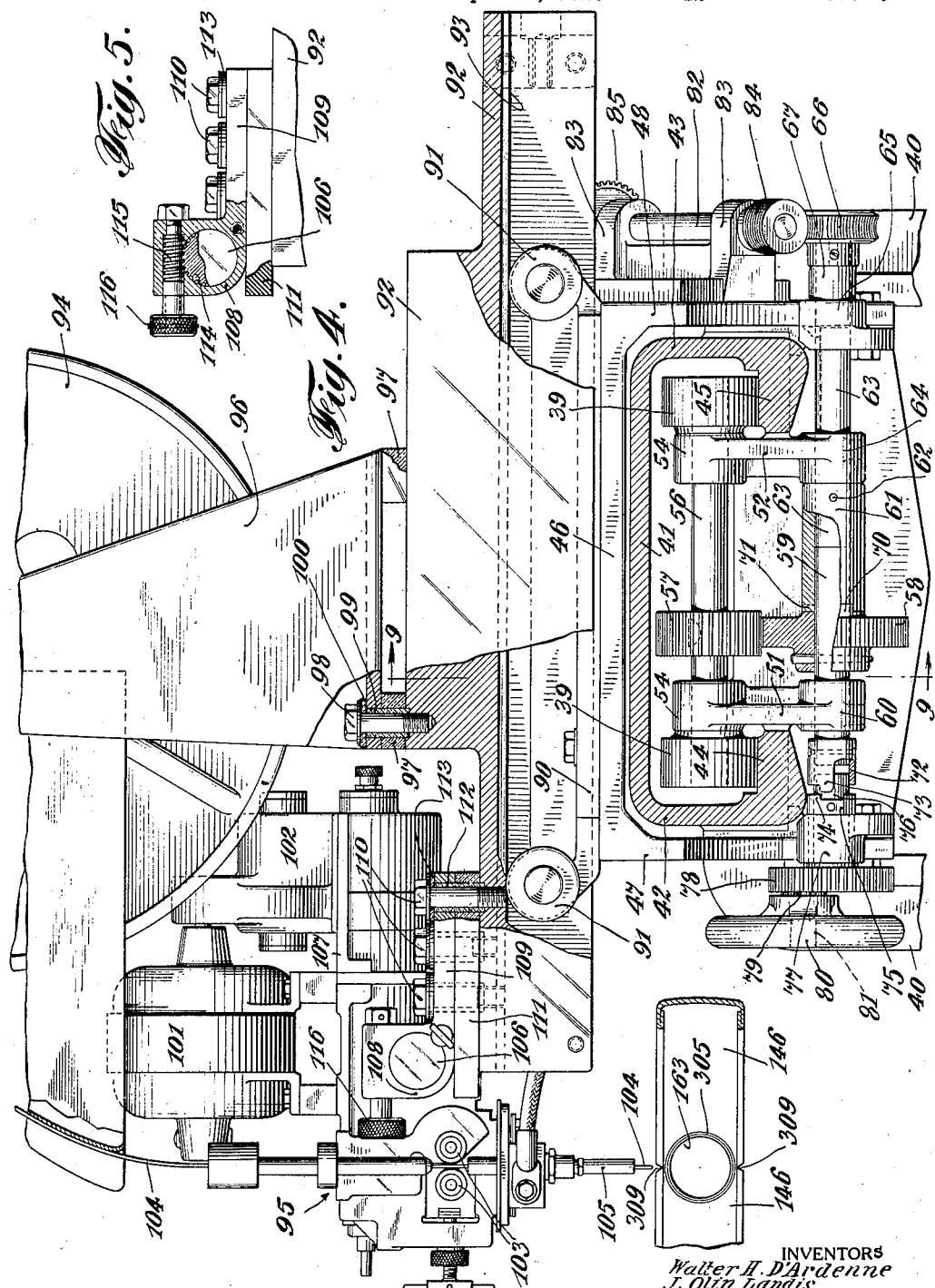
INVENTORS
Walter H. D'Ardenne
J. Olin Landis
Lewis H. Christensen
BY
their ATTORNEY

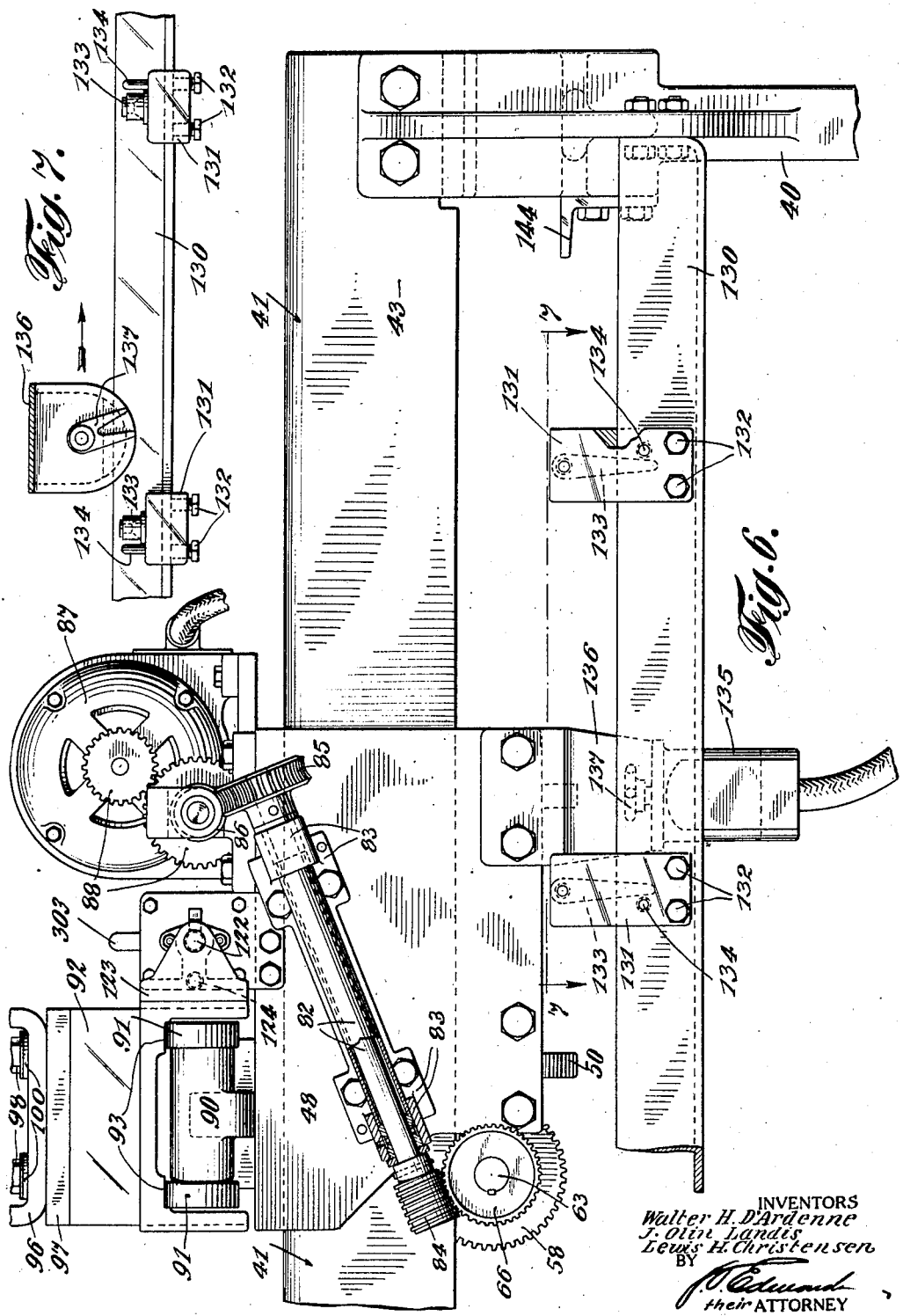

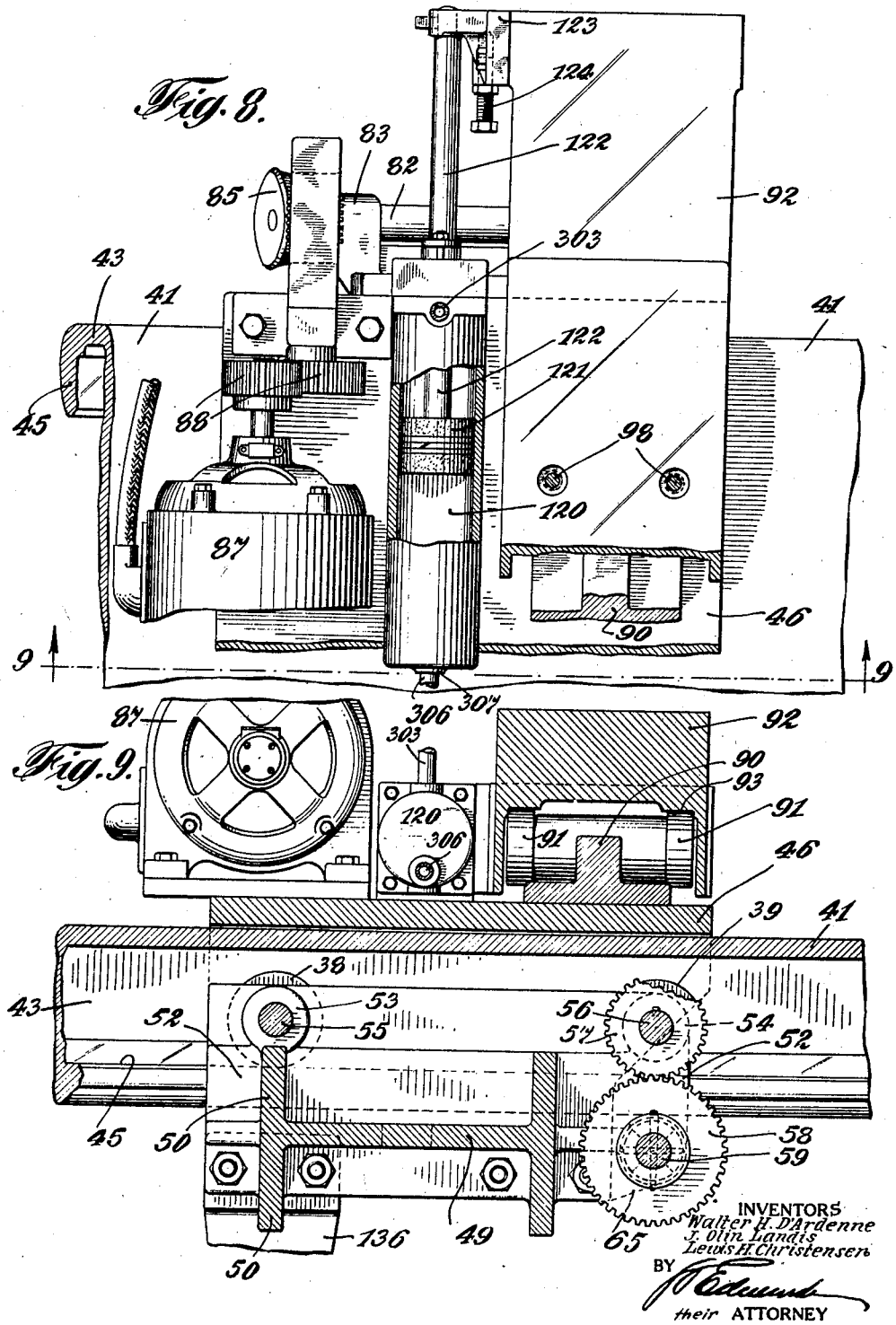

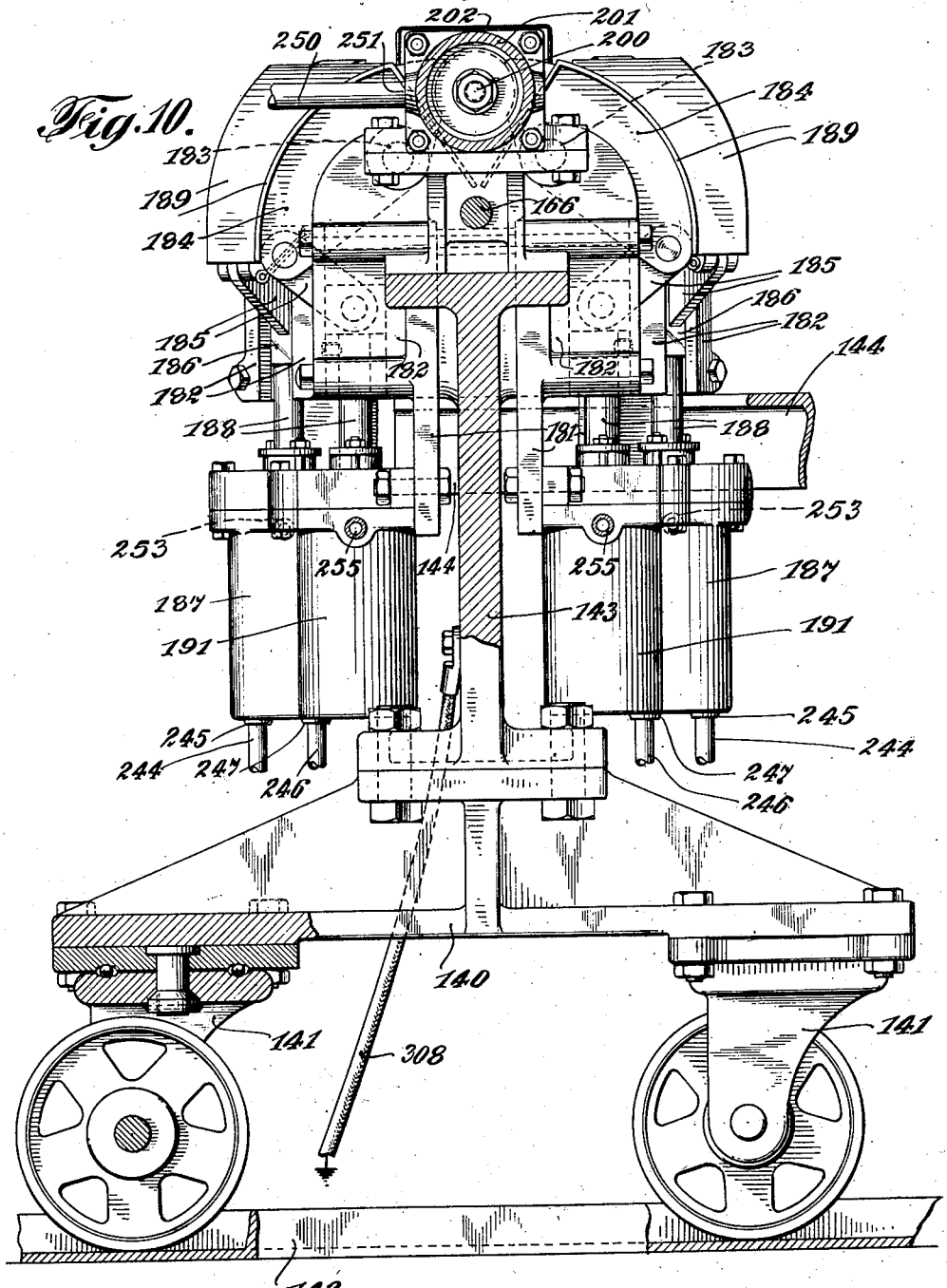

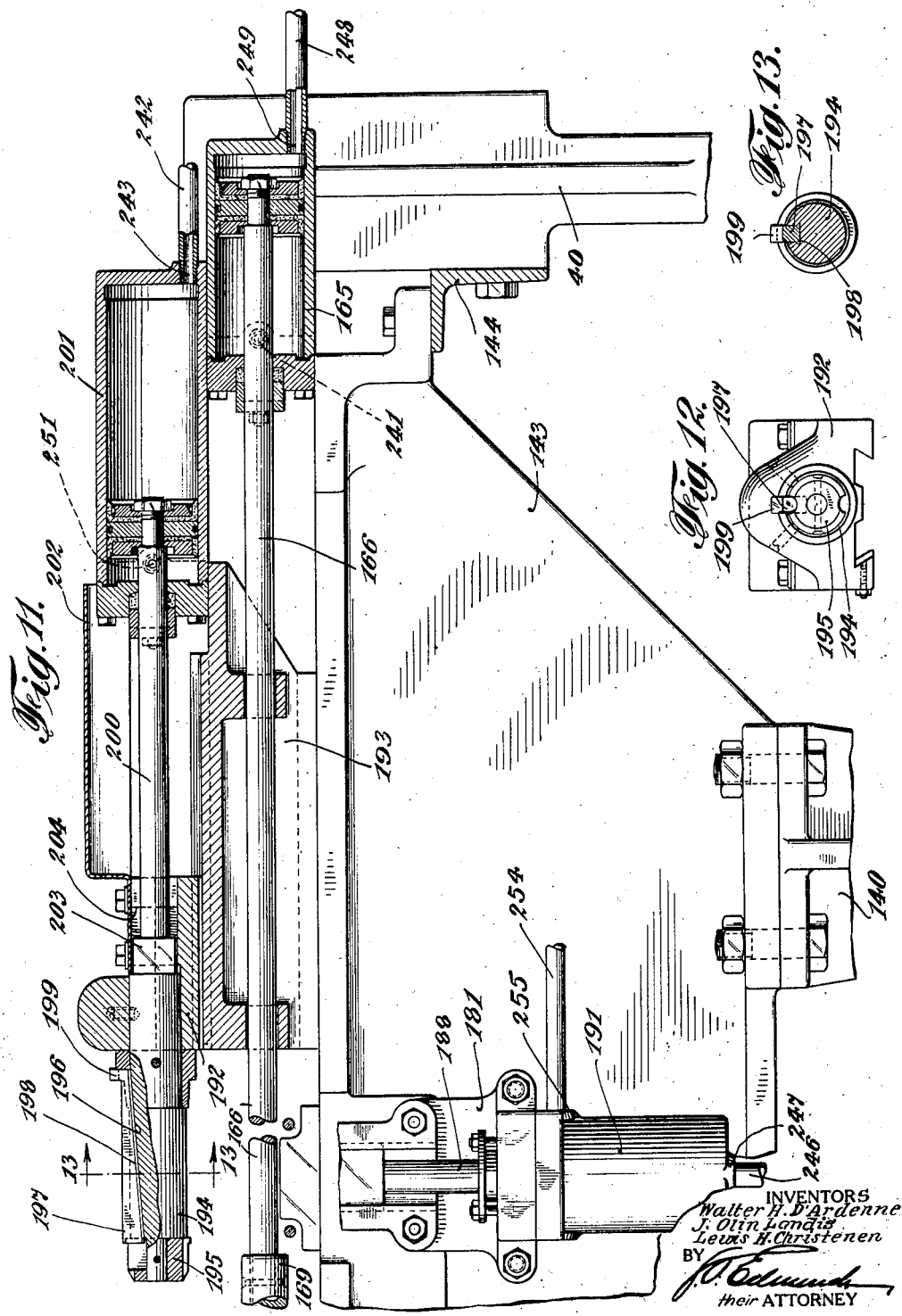

Sept. 11, 1928.
W. H. D'ARDENNE ET AL
1,683,762
WORK HOLDER FOR WELDING
Filed Sept. 12, 1925     12 Sheets-Sheet 9
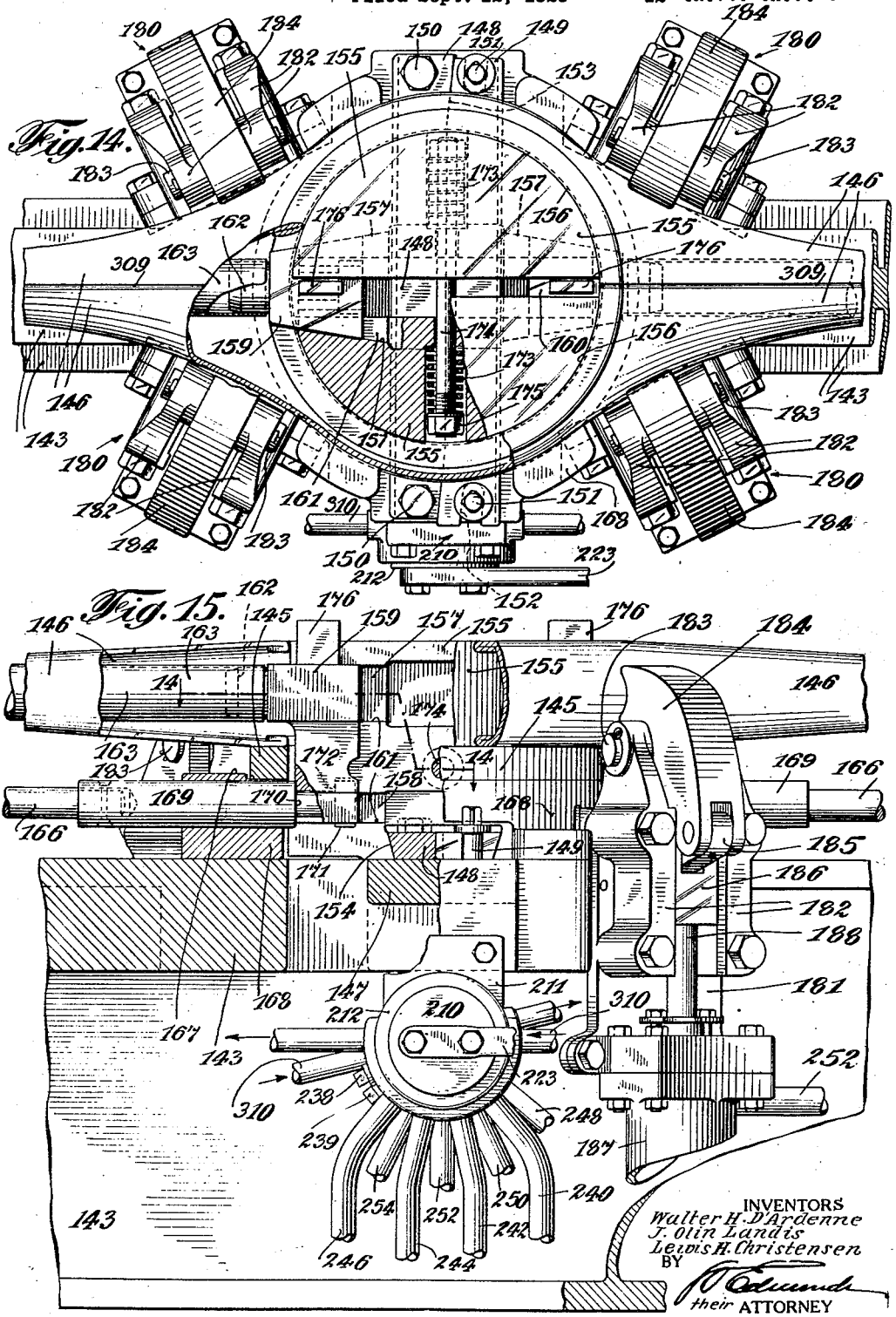
INVENTORS
Walter H. D'Ardenne
J. Olin Landis
Lewis H. Christensen
BY
their ATTORNEY

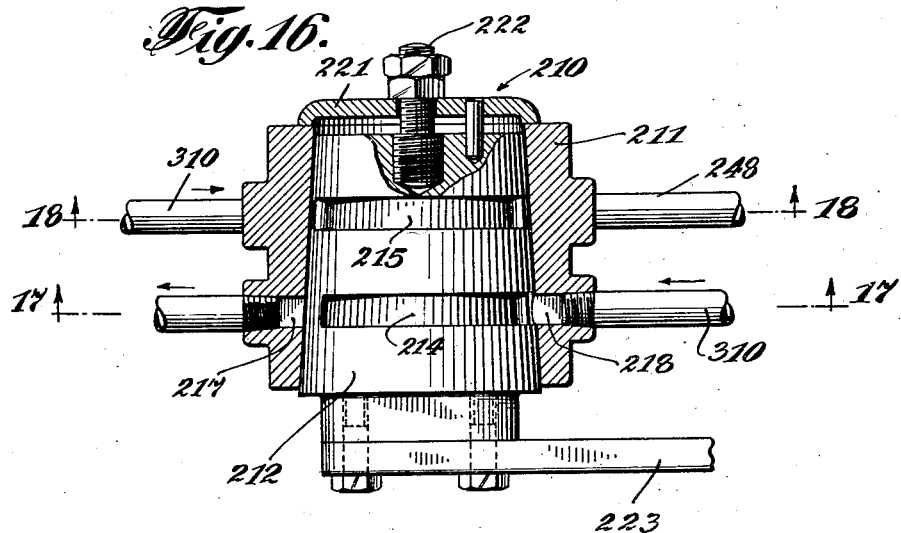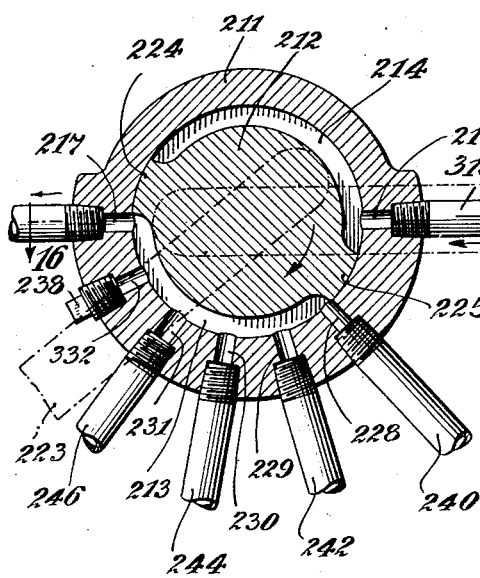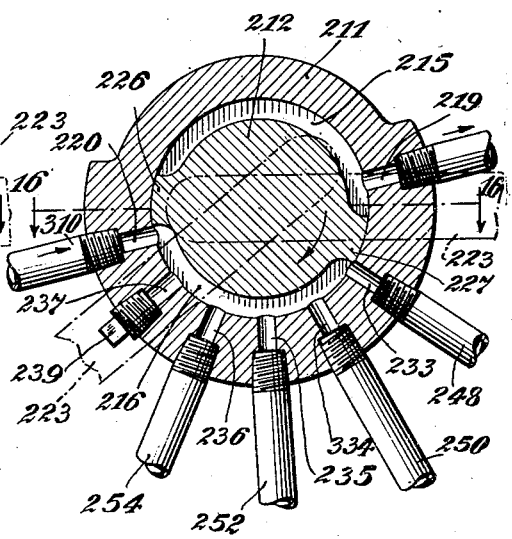

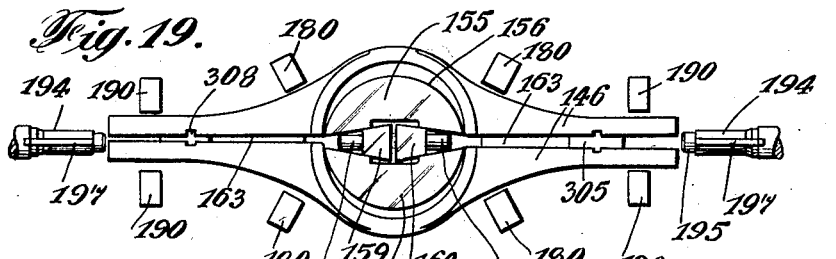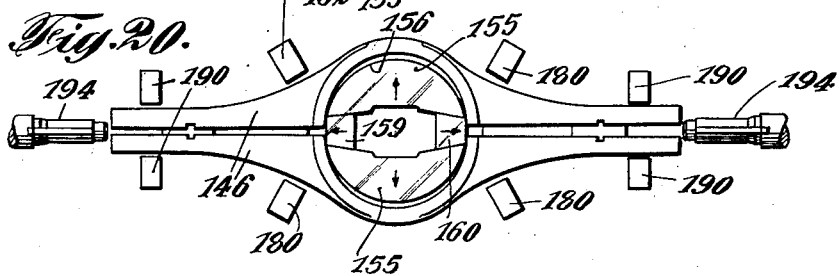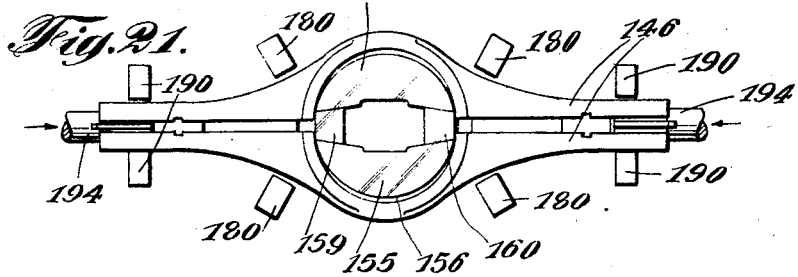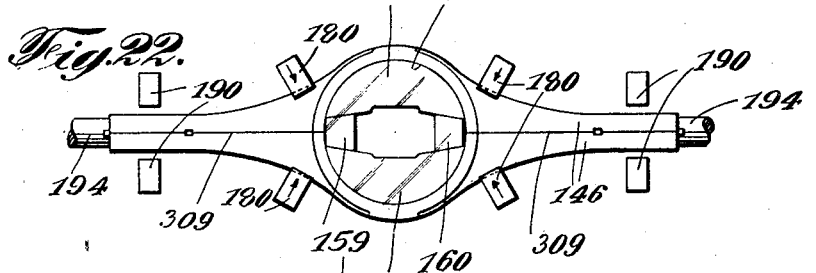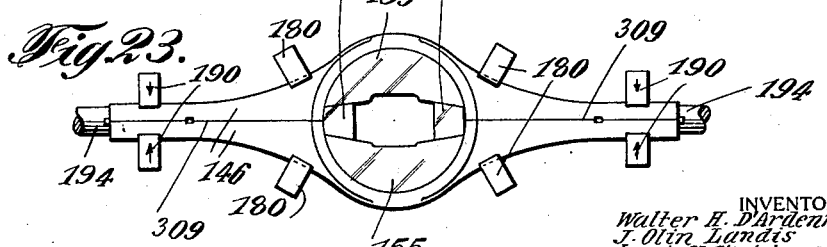

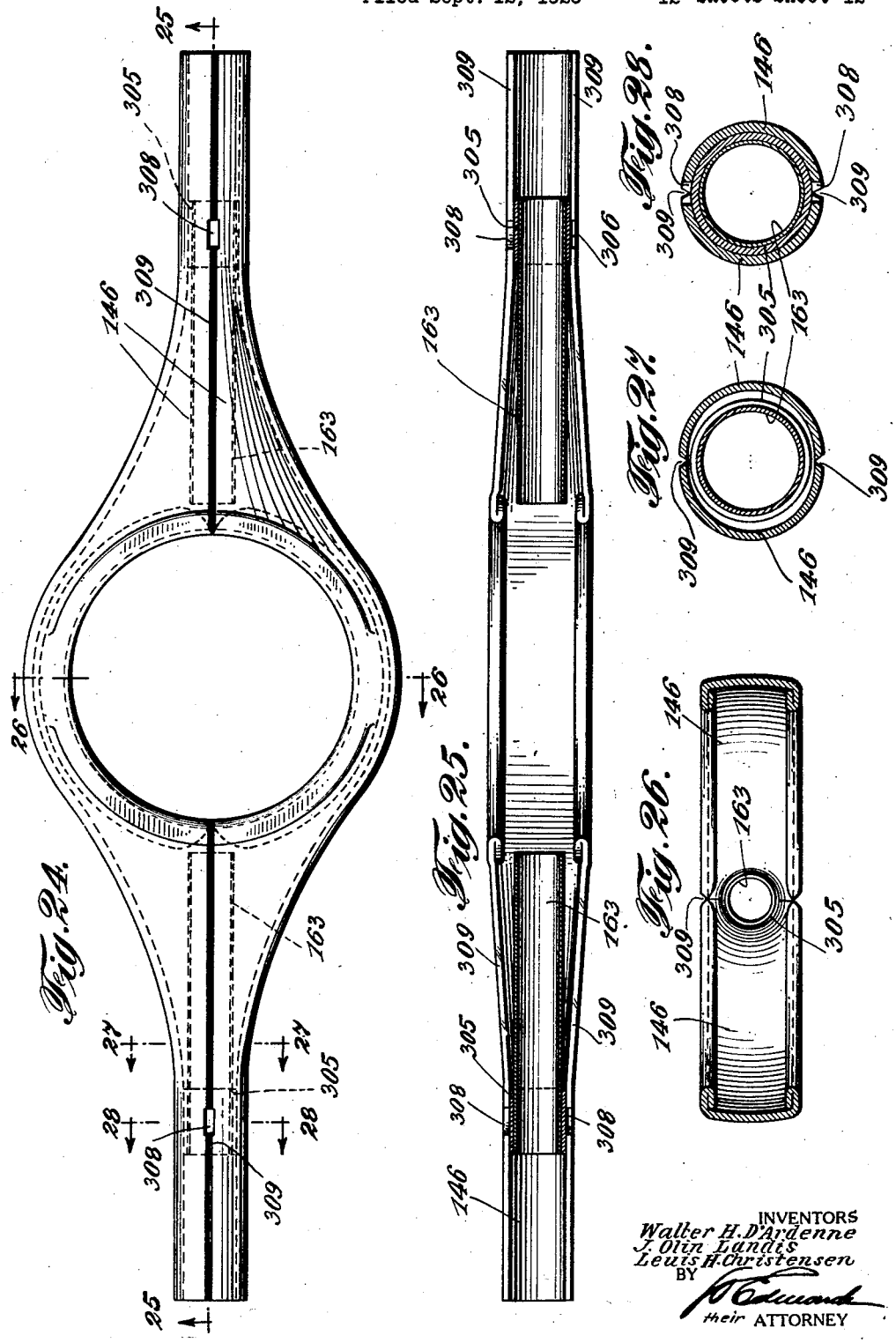

Patented Sept. 11, 1928.

1,683,762

UNITED STATES PATENT OFFICE.

WALTER H. D'ARDENNE, OF LAWNDALE, J. OLIN LANDIS, OF FOX CHASE, AND LEWIS H. CHRISTENSEN, OF PHILADELPHIA, PENNSYLVANIA, ASSIGNORS TO HEINTZ MANUFACTURING COMPANY, OF PHILADELPHIA, PENNSYLVANIA, A CORPORATION OF PENNSYLVANIA.

WORK HOLDER FOR WELDING.

Application filed September 12, 1925. Serial No. 55,934.

This invention relates to automatic welding, and more particularly relates to the automatic welding of axle housings, including improvements in method and in apparatus therefor.

Axle housings for the rear axles and differential gearing of automobiles are well known, and conventionally comprise two longitudinal sheet metal halves seam-welded together. Sometimes bearing tubes are secured within the housing arms. Heretofore this welding has been accomplished by hand, by which is meant that the worker uses a hand welding tool. So far as applicants are aware, the welding of axle housings has not been accomplished heretofore in a satisfactory manner by means of a mechanically directed welding tool, although there are known machines for mechanically directing welding tools to weld together un-stamped plates of light gauge metal, as in the manufacture of metal tanks and containers. To secure a satisfactory seam weld by a mechanically directed tool the parts to be welded together must be held together tightly or the welding will be faulty. Also, variance in the width of the seam is likely to result in faulty welding, which would be apt to be insufficient at the wider portions, or overmuch at the close portions, since the speed of movement of the mechanically directed tool would be constant. Axle housing sections are formed of heavy sheet metal stamped to shape, and the edges are apt to be slightly uneven and rough, and possibly one reason for the failure heretofore to weld them by automatic machines has been the failure to bring and hold the sections together properly. Another source of interference to proper and even seam welding arises from local magnetic fields established in the work during the welding operation, these magnetic forces deflecting the arc in various directions, sometimes entirely away from the work, and repelling the flux from the seam, with the result that the weld is faulty. These magnetic fields are more evident and stronger where heavier metal is worked upon. Therefore, an arrangement which would be satisfactory for light metal would be apt to be entirely inoperative when used for heavier metal, such as used for axle housings. This may be another reason for the failure heretofore to weld axle housings by automatic machines. The shape of the work may also have some influence on these local magnetic fields.

Applicants have invented, constructed and used a machine for welding axle housings automatically, that is, by means of a mechanically directed welding tool, and this is a principal object of this invention. By means of such a machine axle housings may be welded very quickly and in quantities at very low cost, requiring very little labor and a minimum of space.

The welding head which delivers the welding wire, and the automatic means for dispensing this wire in accordance with conditions of the arc, were not invented by us, but are available in the open market, and thus replacement of these parts is less expensive than if special construction were required. We have, however, invented mechanism whereby the welding head is mechanically and automatically directed so as to weld an axle housing in a most satisfactory manner, and to produce even and good welding, without faults, along the seam, and without requiring special treatment of the edges of the housing sections to eliminate roughness and irregularities, and this is another object of our invention.

A further object of our invention is to provide an improved jig which automatically, under the direction of the operator, positions and holds two halves of an axle housing very rigidly and tightly together, and presents them to the automatic welding apparatus in a way which is conducive to the best of welding, and avoids faulty welding due to improper placement and holding of the housing sections, and prevents deformation of the housing during welding.

Another object of our invention is to provide for the easy removal of the jig from the welding mechanism to permit the easy substitution of another jig adapted to an axle housing of a different type or shape, thus providing a machine which will operate on different types and shapes of housings with the same welding apparatus.

During welding there are scattered about showers of sparks, and another object of our invention is to provide a construction wherein all parts which would be likely to suffer injury, if such sparks contacted the same, are protected from contact and injury therefrom.

Another object of our invention is to provide simple and efficient means whereby the operation of the machine may be controlled by the operator.

Broadly stated, the principal object of our invention is to provide a machine, including work holding and welding means, adapted for use in the manufacture of axle housings for automobiles, which economizes manual labor and manufacturing costs; whereby axle housings of different types may be welded in quantities, very quickly; and at the same time is reliable, producing excellent welds uniformly, and is convenient and simple to operate.

Other objects of this invention will be in part obvious and in part pointed out hereinafter.

In accordance with our invention, we provide a jig provided with means for aligning the two axle housing sections with each other, for clamping and holding them tightly together, and for presenting them to the welding apparatus for welding, and preventing distortion of the housing. These means are operated pneumatically and include a system of plungers and clamps, which engage the two axle housing sections when placed on the jig, and there is a single control for actuating these means in a predetermined sequence. The jig preferably is removable bodily from the welding apparatus to permit substitution of another jig designed for a different type or shape of housing, the same welding apparatus being adapted to various types and shapes of housings.

The welding apparatus includes two traveling welding heads, each provided with means for dispensing the wire in accordance with arc conditions during the welding. This type of head is conventional. Each head is mechanically movable transversely of the housing, into welding position thereover, and movable away from the housing to permit a welded housing to be lifted from or turned over in the jig without obstruction. Each head is also mechanically movable longitudinally along the housing, one over each end thereof, and each head welding the seam between one end and the central portion of the housing. The heads preferably move in unison in the same directions, but each head may be caused to move independently of the other. Automatic stops are provided to stop the travel when the end of the seam is reached. Automatic means are also provided for stopping the travel whenever the welding arc is extinguished. Means are also provided for returning the heads to initial position. The machine is so arranged that the operator by a simple control merely starts the mechanical travel of the welding heads, and everything else is automatic.

The machine is constructed with shielding and covering members which prevent welding sparks from harming parts which would be injured by contact therefrom.

In order that a clearer understanding of our invention may be had, attention is hereby directed to the accompanying drawings, forming a part of this application and illustrating certain possible embodiments of our invention. Referring to the drawings, Fig. 1 is a front elevation of the entire machine; Fig. 2 is a top view of the same; Fig. 3 is an end elevation of the same; Fig. 4 is a sectional view on the line 4—4 of Fig. 2; Fig. 5 is a sectional detail of the welding head adjusting mechanism; Fig. 6 is a rear elevation of a portion of the machine; Fig. 7 is a sectional detail on the line 7—7 of Fig. 6; Fig. 8 is a top view of the fragment of the machine, partly broken away; Fig. 9 is a sectional view on the line 9—9 of Figs. 4 and 8; Fig. 10 is a sectional elevational view of the jig taken on the line 10—10 of Fig. 1; Fig. 11 is a longitudinal sectional view of a fragment of the jig, and is taken on the line 11—11 of Fig. 2; Fig. 12 is an end elevation of the plunger and slide shown in Fig. 11; Fig. 13 is a sectional view taken on the line 13—13 of Fig. 11; Fig. 14 is a fragmentary top view of the central portion of the jig unit with certain portions broken away, as on the line 14—14 of Fig. 15; Fig. 15 is a front elevation of the same partially broken away; Fig. 16 is a horizontal sectional view of the master valve, taken on the lines 16—16 of Figs. 17 and 18; Figs. 17 and 18 are sectional views respectively on the lines 17—17 and 18—18 of Fig. 16; Figs. 19 to 23 inclusive are diagrammatical views showing the housing and the successive movements of the work engaging devices with respect thereto; Fig. 24 is a top view of an unwelded axle housing; Fig. 25 is a longitudinal sectional view on the line 25—25 of Fig. 24; and Figs. 26, 27 and 28 are cross sectional views respectively on the lines 26—26, 27—27 and 28—28 of Fig. 24. Similar reference characters refer to similar parts throughout the several views of the drawings.

Referring to the drawings, the support for the welding apparatus includes a plurality of standards 40, to which is attached a casting 41 which extends the full length of the machine and forms an inverted channel having side walls 42 and 43 with inwardly-extending tracks 44 and 45 at their lower edges.

The welding apparatus in the embodiment shown comprises two complete units. Each unit is mounted for longitudinal movement along this table. To this end for each unit there is a casting 46, which embraces the member 41 and has side walls 47 and 48 extending outside of and below the walls 42 and 43. These side walls 47 and 48 are bolted to a plate 49, which is disposed beneath the runways 44 and 45 and is preferably reenforced by webs 50. Extending upwardly from plate 49 and between the runways 44 and 45 are walls 51 and 52 on which are formed two pairs of journals 53 and 54. In each pair of journals there is rotatably mounted an axle, 55 and 56, the ends of which are attached to rollers 38 and 39, which roll on the tracks 44 and 45. One of these axles, 56, has a gear 57 keyed thereto. In mesh with gear 57 is another gear 58, which is pinned to a shaft 59. On one side of gear 58 shaft 59 is journaled in a bearing 60 formed integral with plate 49 beneath one of the journals 54, and on the other side of gear 58 shaft 59 extends into a sleeve 61, which is pinned, as at 62, to another shaft 63, which is in axial alignment with shaft 59. Shaft 63 is journaled in a bearing 64 formed integral with plate 49 beneath the other bearing 54. From bearing 64 shaft 63 extends through a bearing 65 formed on member 49, and at its end carries a worm wheel 66. A collar 67 interposed between the bearing 65 and the hub of the worm wheel prevents inward movement of the shaft 63, and the abutment of sleeve 61 against bearing 64 prevents outward movement of this shaft. The hub of gear 58 has clutch jaws 70 coacting with clutch jaws 71 on sleeve 61, so that when this clutch is engaged gear 58 will rotate with shaft 63. This clutch is disengaged by sliding gear 58 and its shaft 59 away from the sleeve 61. On the other end of shaft 59 is secured a sleeve 72, which has clutch jaws 73, coacting with clutch jaws 74 on a sleeve 75, which is pinned to a stub shaft 76, mounted for rotation in a journal 77 formed on side wall 47. On the outer end of shaft 76 is carried a gear 78, with which meshes a pinion 79 on a stub shaft 81 carried on the wall 47 and rotatable by means of hand wheel 80. When gear 58 is moved to the left (Fig. 4), its connection with shaft 63 is broken, and it becomes connected with shaft 76 through the engagement of clutch jaws 73 and 74. Thus, when the parts are in this position, the welding unit supporting member 46 may be moved longitudinally on the stationary support 41 by rotating hand wheel 80.

The connection between gear 58 and shaft 63 permits similar movement by power means through an enclosed shaft 82 which is carried on brackets 83 mounted on wall 48, the shaft at one end having a worm 84 in mesh with worm wheel 66 and having at its other end a worm wheel 85 which meshes with a worm 86 driven by a motor 87 through suitable gearing 88. The motor and gearing are mounted on the movable support 46.

One of the features of this invention is the protection of the rollers and their runways from contact with sparks emitted during welding operations, and also from dust and dirt, thus insuring even and unobstructed movement of the welding units along the stationary table. To aid in maintaining smooth and even movement, the tracks are machined and well lubricated. The importance of maintaining unobstructed movement of each welding unit will become apparent hereinafter.

Bolted to the top of movable member 46 are castings 90, which carry rollers 91. Resting on rollers 91 is the carriage 92, having downwardly-presented runways or tracks 93. Carriage 92 carries the welding apparatus consisting of a wire-reel 94 and a welding-head which in its entirety is designated 95. Both the reel and the welding-head are insulated from the carriage 92. Reel 94 is supported by brackets 96, which rest on insulation block 97 and are bolted to the carriage 92 as at 98, the bolts being insulated from the brackets by suitable insulating bushing 99 and washer 100.

Each welding-head 95 is broadly conventional, comprising a motor 101, which, through suitable reduction gearing contained in housing 102, drives the wire feed rollers 103. The wire 104 from the reel 94 is engaged between these feed rollers 103 and extends through guide sleeve 105 into position for performing the welding operations. Preferably the welding-head is mounted so as to be adjustable in a limited degree on the carriage 92. It also must be insulated therefrom. The various items of the welding head are mounted on a casting 107, which is rigidly carried on the shaft 106. Shaft 106 is rotatably mounted in bearings 108, provided on a plate 109, which is bolted, as at 110, to the carriage 92. This plate 109 is insulated from the carriage 92 by the interposed insulation block 111 and insulating bushings 112 and washers 113. Shaft 106 has worm teeth 114, and on the bearing member 108 is carried a small worm 115 in mesh with teeth 114. Worm 115 is rotatable by means of a knurled knob 116, whereby the shaft 106 may be rotated relatively to the carriage 92 with the pivot point at this shaft. The purpose of permitting this adjustment is to provide means for bringing the end of the welding wire into exactly the proper location for performing the welding operations.

Pneumatic means are provided for moving the carriage 92 and all the apparatus carried thereby crosswise of the longitudinally movable frame 46. Obviously, manual means may be employed for effecting this movement. As shown, a cylinder 120 is secured to the carriage or frame 46. Within this cylinder is a double-acting piston 121 having a piston rod 122 fixed to a bracket 123 secured to the cross-carriage 92. An adjustable stop bolt 124 limits forward movement of the carriage 92.

As before stated, each motor 87 drives its carriage 46, and all other apparatus mounted thereon, longitudinally. Means are provided for stopping the carriage movement at the end of the welding stroke and for automatically returning the carriage to initial welding position. To this end an angle iron 130 is secured to the rear of the two standards 40, and slidably adjustable along this angle iron are two pair of blocks 131, one pair for each welding unit. Each block straddles a flange of the angle iron and may be locked in place by set screw 132. On each block is a pivoted pawl 133 and a stop pin 134. Each carriage 46 carries a reversing switch 135 on a bracket 136, and the switch has a forked operating member 137, which, when it approaches a block 131 receives the pawl 133 and by reason of stop pin 134 throws the switch, but on reverse movement of the carriage the pawl is free and the switch is not thrown. At the end of the welding movement the switch is thrown to reverse the circuit to the motor 87, and when the carriage has returned to initial position the switch is set to pass the current in the opposite direction to permit starting of motor 87 by the operator, or to start the motor automatically to cause forward travel of the carriages, as desired.

We shall now take up the jig unit. This comprises two lower beams 140 supported on casters 141, preferably arranged to roll in channel tracks 142 located on the floor. Bolted to and extending between and beyond the beams 140 is a frame casting 143 to which the jig parts are secured. The ends of this frame are detachably secured to the standards 40 by angle irons 144, when welding is to be done. Centrally on the top of frame 143 is an annular pedestal 145 on which the housing sections 146 rest. Extending upwardly through this ring 145 and between the housings at their enlarged central portions are two anvil blocks 155 which slidably rest on a bridge portion 147 of frame 143 and against guide bars 148 and 149. Bar 148 is detachably secured to frame 143 over the bridge 147 by bolts 150. Bar 149 is detachably secured to frame 143 over bridge 147 by bolts 151 which seat in slots 152 in this bar. Bars 148 and 149 engage each other along an incline 153, so that by adjusting bar 149 longitudinally with respect to bar 148 this inclined surface contact will cause the distance between the guide surfaces of the bars to be increased or diminished. This permits adjustment to compensate for the wearing down of the guiding surfaces. These guiding surfaces are undercut and coact with similar surfaces on the anvils, as at 154. By reason of the bars 148 and 149 overhanging portions of the anvils, the latter cannot be displaced upwardly unless the bars are removed.

The anvil blocks 155 extend the entire height of the housings and are semi-circular, having a curved peripheral surface, as at 156, which fits each housing section at its curved central portion. The inner side of each block is milled out to provide oppositely tapering wedge surfaces 157 and 158 with which coact a pair of moving wedges 159 and 160, there being shoulders 161 on the anvils to support the wedges. Each wedge has a plunger head 162 which fits snugly into the inner end of a bearing tube 163 (which is part of the housing) when the wedges are moved outwardly. To actuate each wedge there is a pneumatic cylinder 165, mounted on the frame 143, having a piston rod 166 extending through a bearing 167 of annular casting 168 on which rests pedestal ring 145. Each rod 166 has toward its outer end a sleeve 169 abutting wedge 159 or 160, at a shoulder 170, and has a head 171 seated in a recess 172 in the wedge, so that movement of the wedges follows movement of the rods 166 in either direction. Thus it will be seen that when the rods 166 are moved outwardly the wedges cause the anvil blocks 155 to expand tightly against the housing sections, and also will cause the plunger heads 162 of the wedges to enter the bearing tubes 163. These plunger heads thereby place and maintain the engaged ends of the bearing tubes in accurate alignment. When the rods 166 are moved toward the center, the wedges and their plunger heads leave the tubes and the anvil blocks are released for collapsing and withdrawal from engagement with the housing sections. These anvil blocks then may be collapsed by strong opposed springs 173 which encircle a rod 174 extending through both anvil blocks, each spring 173 being collapsed between a nut 175 on an end of the rod and the body of the block. Each wedge may be provided with a projection 176 which may be knocked or hammered to aid in effecting the release of the wedge if such aid becomes necessary.

To clamp the housing sections together at their centers there are four clamping devices 180, each engaging the housing sections diagonally from the outside adjacent their enlarged central portions. For each clamping device there is a bracket 181 bolted to frame 143 and to member 168, the bracket having two parallel projections or walls 182. At the upper ends these projections support a shaft 183 on which is pivoted a clamp 184. The engaging face of the clamp is curved to conform to the housing surface to be engaged thereby. The opposite end of each clamp is cut out to receive a link 185 which is pivotally connected to a block 186 slidably located and guided between the bracket projecting walls 182. Each clamp is actuated pneumatically by means of a cylinder 187 containing a double acting piston which operates a rod 188, connected to a block 186. Each cylinder 187 may be secured to a bracket 181. Each clamp may be protected by a suitable shield 189.

To further position and clamp the housing sections there are provided two pair of clamping devices 190, each pair adapted to engage and clamp together from opposite sides the two halves of one arm of the housing. These clamping devices are similar to the clamping devices 180 heretofore described. The operating cylinders 191 for these clamps are bolted to the main frame 143.

Adjacent each end of the housing is a carriage 192 slidable on a pedestal 193 which is secured to frame 143. At the front of each carriage 192 is a plunger which fits into the outer end of the housing and enters a bearing tube 163 to place the housing ends and the tubes in accurate alignment. Each plunger has a cylindrical body 194, to the end of which is secured a plug 195 which fits in the end of the bearing tube. The body has an inclined longitudinal slot 196 and a wedge 197, preferably of copper, slidable in the slot, and preferably being locked therein by a dovetailed engagement as at 198. If this wedge were not present the body 194, by reason of expansion under the heat of welding, would be apt to be wedged so tightly in the housing that its immediate removal would be difficult. The wedge device 197 permits easy removal of the plunger even while hot, and also provides a taper surface for the initial withdrawal movement of the plunger. When the plunger is taken into the housing the projection 199 on the wedge is engaged by the bearing tube and causes the wedge to be moved home. Each carriage 192 is moved in both directions by means of a piston rod 200 connected to a piston in a cylinder 201, which is secured to pedestal 193. Each piston rod 200 carries a block 203 which has some lost motion between plunger body 194 and a shoulder 204 on carriage 192. Thus, on return movement, the block 203 knocks against the shoulder 204 and an additional force of momentum and impact is created to initiate movement of plunger from the housing after welding. Preferably a cover 202 is provided to protect the piston rod 200 from welding sparks and dirt. Each carriage 192 has a dovetail sliding engagement on pedestal 193 to prevent displacement of the carriage and to maintain the plunger 194 in proper and accurate alignment.

As before stated, the various housing positioning and holding devices are operated pneumatically. Preferably all are operated from a single control. The control shown comprises a valve 210, consisting of a housing 211 bolted to the frame 143, and a valve cone 212 within the housing. The cone has four semicircular passages, one, 214, to let air into the jig cylinders to actuate the work engaging devices into engagement with the work, another, 213, to allow this air to exhaust, another, 216, to let air into the cylinders to take the pistons into releasing position, and the fourth passage, 215, to allow this air to exhaust. The housing has an air intake 218, through pipes 310 and 301, from a suitable source of compressed air, into passage 214, an outlet 217 from passage 213, a compressed air intake 220 into passage 216, and an outlet 219 from passage 215. The cone 212 is rotatably held in the casing by a cover or yoke 221 and a bolt 222, and is rotatable back and forth for about 140 degrees by means of a single operating handle 223. Passages 213 and 214 are opposite each other, as are also the passages 215 and 216. Walls 224 and 225 on the cone separate passages 213 and 214 and walls 226 and 227 on the cone separate passages 215 and 216. When the handle 223 is at the extreme right (see Figs. 17 and 18) the outlet 217 is open into passage 213, which in this position communicates with air ports 228, 229, 230, 231 and 332 through the housing. Passage 214 which communicates with inlet port 218 has no outlet in this position of the valve. At the same time the inlet port 220 is open into passage 216 and air ports 233, 234, 235, 236 and 237 communicate with this passage. In this position 215 communicate only with outlet 219. In the present embodiment ports 232 and 237 are not used and, therefore, are closed by suitable plugs 238 and 239. Pipes 240 connect port 228 to the ports 241 of both wedge operating cylinders 165. Pipes 242 lead from port 229 to ports 243 in each of the end plunger operating cylinders 201. Pipes 244 lead from port 230 to the ports 245 of all four central clamp operating cylinders 187. Pipes 246 lead from port 231 to the ports 247 in the arm clamp operating cylinders 191. Pipes 248 lead from port 233 to ports 249 in cylinders 165. Pipes 250 lead from port 234 to ports 251 in cylinders 201. Pipes 252 lead from port 235 to ports 253 of cylinders 187. Pipes 254 lead from port 236 to ports 255 of cylinders 191. The valve arrangement is such that as the handle 223 is moved to the left from the aforementioned position, then, by reason of wall 225, each port 228, 229, 230, 231 and 332 is taken out of communication with passage 213 and outlet 217 and brought into communication with passage 214 and inlet 218, in the sequence stated. At the same time, by reason of wall 227, each port 233, 234, 235, 236 and 237 is taken out of communication with passage 216 and inlet 220 and brought into communication with passage 215 and outlet 219. The former sequence lags slightly behind the latter sequence to insure exhaust at one side of each piston before pressure is let in at the other side.

Thus it will be apparent that when the handle is at the extreme right (see Figs. 17 and 18) compressed air enters ports 249, 251, 253 and 255 of cylinders 165, 201, 187 and 191, and air exhausts through ports 241, 243, 245 and 247 of these cylinders, and the clamping devices are in work releasing positions, as shown in Fig. 19. Now, as the valve handle is moved to the left, as indicated by the arrow in Figs. 17 and 18, the following sequence transpires. Compressed air through port 218, passage 214, port 228 and pipe 240 enters ports 241 of cylinders 165 and at the same time air exhausts from cylinders 165 through ports 249, line 248, port 233, passage 215 and valve exhaust port 219. This actuates wedges 159 and 160 to spread anvil blocks 155 and to take the plunger heads 162 into bearing tubes 163, see Fig. 20. Then compressed air through port 229, pipe 242 enters ports 243 of cylinders 201 and at the same time air exhausts through cylinder ports 251, pipe 250, valve port 234, passage 215 and exhaust 219. This takes end plungers 194 into engagement with the outer ends of the axle housing arms and bearing tubes 163, see Fig. 21. Then compressed air through port 230 and pipes 244 enters ports 245 of cylinders 187, and at the same time air exhausts through ports 253 of these cylinders, pipes 252, valve port 235, passage 215 and exhaust 219. This engages the diagonal central clamp 180 with the work, see Fig. 22. Finally, compressed air through port 231 and pipe 246 enters ports 247 of cylinders 191, and at the same time air exhausts from cylinder ports 255, through pipes 254, valve port 236, passage 215 and exhaust 219. This takes the arm clamps 190 in engagement with the work, see Fig. 23. The housing sections are thus placed in accurate alignment and are held tightly clamped together and held against distortion by the heat of welding. The housing is also in accurate position on the jig, and the lines to be welded are placed in an exact predetermined location so that the welding wire will align therewith accurately, without requiring adjustment of the welding machine or jig for each housing to be welded.

To release the work, the valve handle is moved from left to right (Figs. 17 and 18), that is, counterclockwise. Air will now leave the cylinder ports through which air entered during the engaging operation and compressed air will enter the cylinder ports through which air was exhausted, following the engaging movement of the valve handle. The devices, of course, will be actuated in the reverse sequence, as movement of valve handle is reversed.

After the housing has been engaged on the jig in the manner stated, the operator now operates the valve 300 to cause air from a supply coming from pipes 301 and passing through pipes 302 into the port 303 of cylinders 120 to bring the welding units forwardly into position over the housing. If more accurate adjustment is necessary, the operator accomplishes this by turning knobs 116. After adjustment for the first housing, adjustment for succeeding housings is required very seldom. Having obtained proper adjustment of the welding wire over the seams to be welded, the operator actuates the switches 304 to start the motors 87, which move the welding units along the housing seams to be welded, and the seams are welded automatically by the apparatus heretofore described. The operation of the welding head is well known and, therefore, a detailed description thereof is believed to be unnecessary. Should the operator wish to stop the travel of either or both of the welding units, he actuates one or both of the switches 304 accordingly. Otherwise the units travel the full length of the seam to be welded and until switches 136 are actuated by their stop blocks 131 to reverse the motor and cause return movement of the welding units to initial position. After the welding is completed, the operator turns valves 300 to exhaust air through ports 303 of cylinders 120 and to cause air to pass through pipes 306 to ports 307 of these cylinders, thus causing the welding units to be moved away from the housing. The operator may cause this movement at any time he so desires.

The jig and housing thereon are suitably grounded, as by conventional ground wires 308, attached to the frame 143 of the jig. Obviously, the grounds may be established at other places, and either directly to the housing, or to the jig or to any desired part, so long as the ground established is conducive to proper and reliable welding by means of the apparatus employed. The circuit wires to the welding heads are shown at 299.

When it is desired to weld bearing tubes 163 within the arms of the housings, it is suggested a small sleeve 305 be placed on and welded to the end of each tube and then the tube and sleeve be secured in place on one housing section by slight spot welding. The edges of housing sections may be cut out slightly over these sleeves, as at 308, which will result in the welding wire, as it passes these points, establishing a large and strong weld between the sleeves and the housing sections, thus securely fastening the tubes in accurate, aligned position within the housing arms.

Preferably the edges of the housing are arranged to meet in a V, as at 309, which fills up with the welding flux, and thus a very strong weld is obtained. This V-shaped seam, however is optional.

As before stated, whenever the welding arc becomes extinguished, the advancing of the welding head ceases, and as soon as the arc is restored the advance movement resumes. This may be accomplished by placing the arc in the circuit which drives the motor 87, the circuit for reversing the motor, however, is not through the arc.

Although the machine above described as illustrating one specific embodiment of our invention has been designed primarily for welding axle housings, it is readily apparent that machines adapted to operate on other articles may be built in accordance with and under our invention herein disclosed. Obviously, many changes can be made in the construction and as the invention can have many embodiments, apparently differing from each other in a wide degree, it is to be understood that all matter contained in the above description or shown in the accompanying drawings shall be interpreted as illustrative and not in a limiting sense. It is also to be understood that the invention is not limited to the specific features of construction, arrangement of parts or combinations of elements, shown or described, but that the scope of the invention is as broad as is indicated in the claims which follow.

What we claim is:—

1. In a jig of the character described, in combination, a support for work of elongated shape, means, comprising a system of pneumatic work engaging devices engageable with said work toward its center and also at its ends and also at intermediate points, for placing and maintaining said work rigidly in predetermined position on said jig, and a single control means for operating all of said work engaging devices in predetermined sequence.

2. In a jig for an unwelded axle housing having a bowed-out central portion and opposite arms and comprising two longitudinal complementary sections, and a bearing tube in each housing arm, plungers engageable within the inner and outer ends of said bearing tubes, when said housing is on the jig, whereby said tubes are placed and held in accurate alignment.

3. In a jig for an unwelded axle housing having a bowed-out central portion and opposite arms and comprising two longitudinal complementary sections, a pair of movable anvil blocks fitting within the bowed-out portion of the housing, when on the jig, movable wedges, coacting with said blocks, and means for moving said wedges for expanding said blocks into firm engagement with the adjacent portions of the housing.

4. In a jig for an unwelded axle housing having a bowed-out central portion and opposite arms and comprising two longitudinal complementary sections, a pair of movable anvil blocks fitting within the bowed-out portion of the housing, when on the jig, movable wedges, coacting with said blocks, means for moving said wedges for expanding said blocks into firm engagement with the adjacent portions of the housing, and spring means for collapsing said blocks when released by said wedges.

5. In a jig for an unwelded axle housing having a bowed-out central portion and opposite arms and comprising two longitudinal complementary sections, a pair of anvil blocks fitting within the bowed-out portion of the housing, when on the jig, and expansible into firm contact with the adjacent portions thereof, a pair of bars secured to the jig and having opposite exterior guide surfaces coacting with said blocks, said bars having a mutual tapered surface abutment, and one of said bars being movable longitudinally with respect to the other whereby the distance between said guide surfaces may be varied to accurately coact with said blocks.

6. In a jig for an unwelded axle housing having a bowed-out central portion and opposite arms and comprising two longitudinal complementary sections, a pair of anvil blocks fitting within the bowed-out portion of the housing, when on the jig, and expansible into firm contact with the adjacent portions thereof, a pair of bars secured to the jig and having opposite exterior guide surfaces coating with said blocks, said bars having a mutual tapered surface abutment, and one of said bars being movable longitudinally with respect to the other whereby the distance between said guide surfaces may be varied to accurately coact with said blocks, the said guide surfaces of said bars inclining over the adjacent surfaces of said blocks and confining said blocks against upward displacement.

7. In a jig for an unwelded axle housing having a bowed-out central portion and opposite arms and comprising two longitudinal complementary sections, a pair of movable anvil blocks fitting within the bowed-out portion of the housing, when on the jig, movable wedges, coacting with said blocks, and means for moving said wedges for expanding said blocks into firm engagement with the adjacent portions of the housing, said blocks having guide channels, and said wedges having portions disposed in said channels and confined between the walls thereof against upward and downward displacement with respect to said blocks.

8. In a jig for an unwelded axle housing having a bowed-out central portion and opposite arms and comprising two longitudinal complementary sections, and bearing tubes within the housing arms, anvil blocks fitting within the bowed-out portion of the housing, when on the jig, movable wedges, coacting with said blocks, plunger heads on said wedges engageable in the inner ends of said bearing tubes, and means for moving said wedges apart to expand said blocks into firm engagement with the adjacent portions of the housing and to engage said plunger heads in the inner ends of said bearing tubes, whereby said housing portions and tube ends are placed and held firmly in accurate alignment.

9. In a jig for an unwelded axle housing having a bowed-out central portion and opposite arms and comprising two longitudinal complementary sections, and bearing tubes within the housing arms, anvil blocks fitting within the bowed-out portion of the housing, when on the jig, movable wedges, coacting with said blocks, plunger heads on said wedges engageable in the inner ends of said bearing tubes, means for moving said wedges apart to expand said blocks into firm engagement with the adjacent portions of the housing and to engage said plunger heads in the inner ends of said bearing tubes, whereby said housing portions and tube ends are placed and held firmly in accurate alignment, means engageable with the housing from the outside at its central portion for clamping the central portions of the housing sections firmly together and against said anvil blocks, means engageable with said housing arm portions for clamping said arm portions firmly together, and plungers engageable within the outer ends of the housing arms and bearing tubes to place and hold firmly said arm ends and tube ends in accurate alignment, and means for actuating each of said means.

10. In a jig for an unwelded axle housing having a bowed-out central portion and opposite arms and comprising two longitudinal complementary sections, and bearing tubes within the housing arms, anvil blocks fitting within the bowed-out portion of the housing, when on the jig, movable wedges, coacting with said blocks, plunger heads on said wedges engageable in the inner ends of said bearing tubes, means for moving said wedges apart to expand said blocks into firm engagement with the adjacent portions of the housing and to engage said plunger heads in the inner ends of said bearing tubes, whereby said housing portions and tube ends are placed and held firmly in accurate alignment, means engageable with the housing from the outside at its central portion for clamping the central portions of the housing sections firmly together and against said anvil blocks, means engageable with said housing arm portions for clamping said arm portions firmly together, and plungers engageable within the outer ends of the housing arms and bearing tubes to place and hold firmly said arm ends and tube ends in accurate alignment, and means for actuating all of said means in predetermined sequence, said actuating means including pneumatic devices and a single control valve for all of said devices.

11. In a jig for an unwelded axle housing having a bowed-out central portion and opposite arms and comprising two longitudinal complementary sections, and bearing tubes within the housing arms, anvil blocks fitting within the bowed-out portion of the housing, when on the jig, movable wedges, coacting with said blocks, plunger heads on said wedges engageable in the inner ends of said bearing tubes, means for moving said wedges apart to expand said blocks into firm engagement with the adjacent portions of the housing and to engage said plunger heads in the inner ends of said bearing tubes, whereby said housing portions and tube ends are placed and held firmly in accurate alignment, means engageable with the housing from the outside at its central portion for clamping the central portions of the housing sections firmly together and against said anvil blocks, means engageable with said housing arm portions for clamping said arm portions firmly together, and plungers engageable within the outer ends of the housing arms and bearing tubes to place and hold firmly said arm ends and tube ends in accurate alignment, means for actuating all of said means in predetermined sequence, said actuating means including pneumatic cylinders, double-acting pistons within said cylinders, a valve, air pipes connecting said valve with said cylinders on both sides of the pistons, a source of air supply leading to said valve, exhaust outlets from said valve, a valve cone, and a single operating handle for rotating said cone, said cone having passages and closure walls coacting with the valve ports in predetermined sequence.

This specification signed this 10th day of September, 1925.

WALTER H. D'ARDENNE.
J. OLIN LANDIS.
LEWIS H. CHRISTENSEN.